United States Patent
Rathnam et al.

(10) Patent No.: US 10,462,642 B1
(45) Date of Patent: Oct. 29, 2019

(54) PANIC MODE MANAGEMENT IN A COMMUNICATION DEVICE

(71) Applicant: Republic Wireless, Inc., Raleigh, NC (US)

(72) Inventors: Sai Rathnam, Raleigh, NC (US); Jared Kashimba, Micanopy, FL (US); James Mulcahy, Raleigh, NC (US); Matthew Newton, Park Ridge, IL (US); Gregory Stephens, Cary, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 16/190,288

(22) Filed: Nov. 14, 2018

(51) Int. Cl.
| | |
|---|---|
| *H04B 7/00* | (2006.01) |
| *H04W 4/90* | (2018.01) |
| *G08B 25/01* | (2006.01) |
| *H04W 8/00* | (2009.01) |
| *H04W 4/80* | (2018.01) |
| *G08B 25/10* | (2006.01) |
| *H04W 88/02* | (2009.01) |

(52) U.S. Cl.
CPC .......... *H04W 4/90* (2018.02); *G08B 25/016* (2013.01); *G08B 25/10* (2013.01); *H04W 4/80* (2018.02); *H04W 8/005* (2013.01); *H04W 88/02* (2013.01)

(58) Field of Classification Search
USPC .............................................. 455/521, 414.1
See application file for complete search history.

(56) References Cited

U.S. PATENT DOCUMENTS

| | | | | |
|---|---|---|---|---|
| 2011/0046498 A1* | 2/2011 | Klap | ............... | A61B 5/0205 600/534 |
| 2013/0016449 A1* | 1/2013 | Crandall | ............... | F41H 9/10 361/232 |
| 2016/0050037 A1* | 2/2016 | Webb | ............... | H04W 4/90 455/3.01 |
| 2018/0075720 A1* | 3/2018 | Davies | ............... | H04W 4/90 |

* cited by examiner

*Primary Examiner* — Tu X Nguyen
(74) *Attorney, Agent, or Firm* — Gregory Stephens

(57) ABSTRACT

Techniques are disclosed for managing a panic mode for a communication device. The communication device may trigger a panic mode causing the communication device to emit an audible alert while simultaneously causing the communication device to capture any detected sound at a frequency below the audible alert. The communication device may also collect metadata including a date stamp, a time stamp, and a location that may be associated with any captured audio and stored locally or streamed to a communications server for storage. The communication device may also send a message to one or more other endpoints indicative of the communication device having engaged panic mode.

21 Claims, 3 Drawing Sheets

400

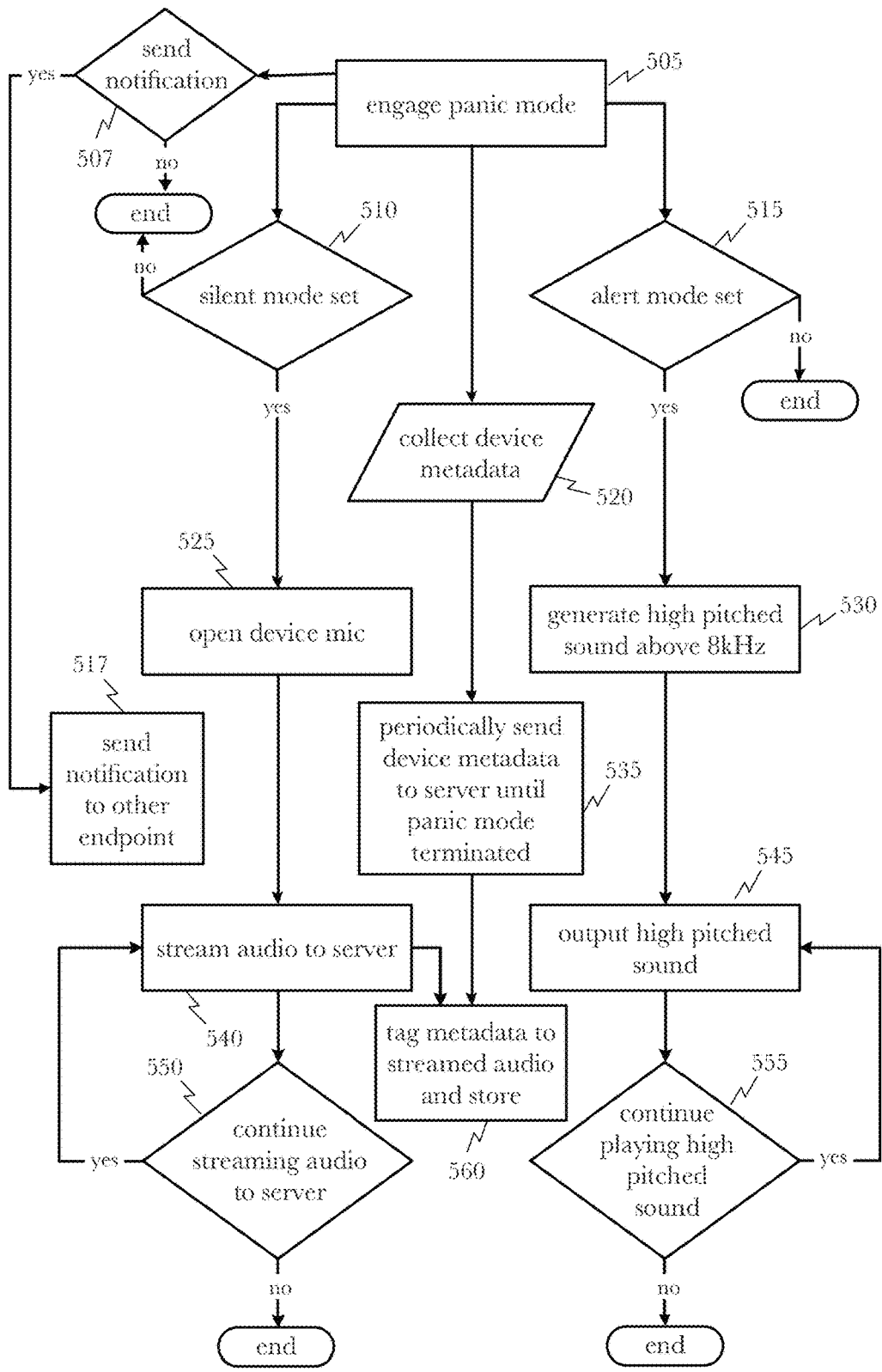

PANIC MODE MANAGEMENT IN A COMMUNICATION DEVICE

TECHNICAL FIELD

Examples described herein are generally related to techniques for providing and managing panic mode settings in a communication device.

BACKGROUND

New forms of portable communication device utilizing synchronous and asynchronous style communication over known wireless communication protocols such as 802.11 WiFi and cellular are starting to come to market. For instance, the Relay device by Republic Wireless® is a screenless disk-like handheld device that can enable voice and data communication with other Relay devices similar to the way walkie-talkies communicate. Many of these communication devices utilize an Internet Protocol (IP) communication link rather than a circuit switched communication link to exchange voice data with a communications server. The communications server mediates voice messages between and among various endpoints. The communication device(s) may wirelessly connect to an IP network over one or more wireless IP interfaces and communication links.

The IP communication link may be 802.11 based such as WiFi or may be cellular based utilizing at least one of the many cellular IP air interfaces. There are several cellular IP air interfaces already in existence that use specific frequency ranges that are suitable for use with the embodiments described herein. It should be noted that the term 802.11 encompasses all of the 802.11 versions that currently exist and may be developed. Some cellular IP air interface examples include the General Packet Radio Service (GPRS), Enhanced Data for GSM Evolution (EDGE), Evolution-Data Optimized (EV-DO), High Speed Packet Access (HSPA), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), and High Rate Packet Data (HRPD). Moreover, there are many more wireless IP air interfaces in the planning and/or experimental stages (e.g., 5G, light-wave based, etc.) that use the same and/or different frequencies that would also be suitable for use with the embodiments described herein.

These portable communication devices may also communicate with network based servers and other endpoints such as, for instance, smartphones, computers or tablets to enable a variety of use cases.

One such use case for a portable communication device may be to act as safety enhancing device. For instance, the communication device may be programmed for a panic mode to deter would be assailants. In such a mode, the communication device may send out a shrill alarm sound while simultaneously recording the ambient environment with the alarm sound filtered out of any recording. Additionally, the recording may be periodically tagged with meta data including, at a minimum, a location and time stamp. The recording and metadata may then be uploaded to a server for storage and/or real-time forwarding to one or more relevant other endpoints.

What is needed are techniques for easily and intuitively managing a panic mode for a portable communication device.

BRIEF DESCRIPTION OF THE DRAWINGS

FIG. 5 illustrates an example of a logic flow diagram according to an embodiment of the invention.

DETAILED DESCRIPTION

Figure 1:
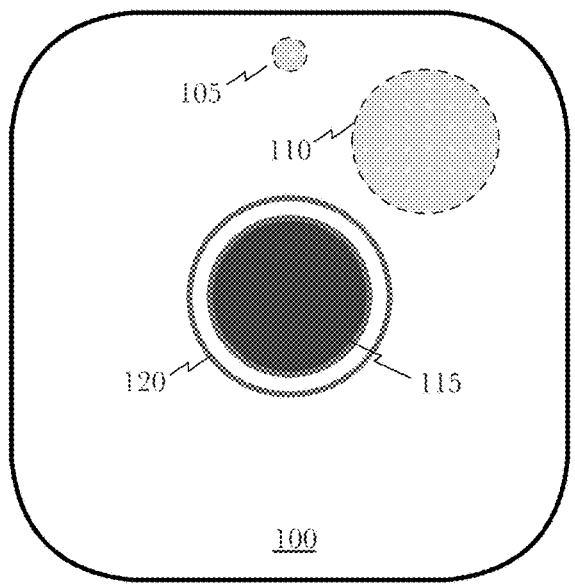
FIG. 1 illustrates an external view of a portable communication device according to an embodiment of the invention.

The embodiments described herein disclose systems, methods, and computer program products for implementing and executing a panic mode between or among communication devices on a communications network. The systems and methods of the invention may be embodied in and performed by network based communications server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access.

As used herein the term "communication device" is meant to generally indicate an end user physical device intended for, among other things, exchanging voice and data communication with other similar communication devices or network based servers over one or more inter-connected communication networks. A communication device may be equipped with multiple RF transceivers including an 802.11 WiFi transceiver, a cellular banded transceiver, and (optionally) a Bluetooth transceiver. Other similar RF transceivers configured to use various frequency ranges may also be implemented on the communication device as they are developed. Other examples may be understood to those of ordinary skill in the art.

References herein to a communication device capable of connecting to or communicating via a mobile radio access network (MRAN) refer to a communication device equipped with a cellular transceiver for wireless communication with basestations for purposes of accessing cellular IP data services. Similarly, references herein to a communication device capable of connecting to or communicating via an IP data network refer to a communication device equipped with a transceiver for wireless communication (e.g., 802.11 WiFi) with a router or other IP data network access point.

As used herein, the term "communications server" is intended to mean an IP based computer that, among other capabilities, mediates and manages voice and data communications among communication devices over one or more inter-connected communication networks. A communications server may also receive, store, and forward voice or data from a communication device to one or more other relevant servers, endpoints, and/or communication devices.

As used herein, the term "communication link" is intended to mean a physical and/or logical path that connects a communication device with the IP based communications server. A communication link may be a signaling link, a media link, or both. In this context, a voice communication may be established via one or more communication links in which the IP based communications server is an endpoint for each of the communication links. The IP based communications server may then join one or more communication links together to establish a channel between or among two or more communication devices. The IP based communications server may be hosted within an IP network accessible to the Internet.

FIG. 1 illustrates an external view of a portable communication device 100 according to an embodiment of the invention. From an external front point of view, the communication device 100 may include an input button 115 generally used to put the communication device 100 into a transmission mode. However, input button 115 may be configured for multiple different functions depending on the current use case associated with the communication device 100. For instance, a specific interaction with the input button 115 may engage a panic mode for the communication device that initiates a series of actions. A microphone 105 picks up sound content to be transmitted while a speaker 110 outputs or plays back received audio such as voice communications that are received. A light emitting diode (LED) 120 mechanism in the shape of a ring, in this embodiment, surrounding the input button 115 may be implemented as a mechanism of providing certain types of visual feedback.

Figure 2:
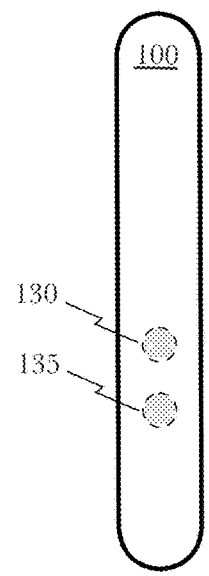
FIG. 2 illustrates a side view of a portable communication device according to an embodiment of the invention.

FIG. 2 illustrates a side view of a portable communication device 100 according to an embodiment of the invention. From an external side point of view, the communication device 100 may include a power button 130 generally used to power cycle the communication device 100 off and on. The communication device 100 may further include a volume button 135 generally used to change the output volume of the communication device 100. Both the power button 130 and volume button 135 may be re-configured to perform other functions depending on the current mode of the communication device 100. For instance, the power button 130 and volume button 135 may be programmed according to the method with which they are engaged which may include long presses, multiple rapid presses, or the like. The aforementioned description of the communication device is illustrative only. One of ordinary skill in the art may vary the design of the communication device 100 and buttons 115, 130, 135 without altering or affecting the claimed patentable elements, steps, or processes made herein.

Figure 3:
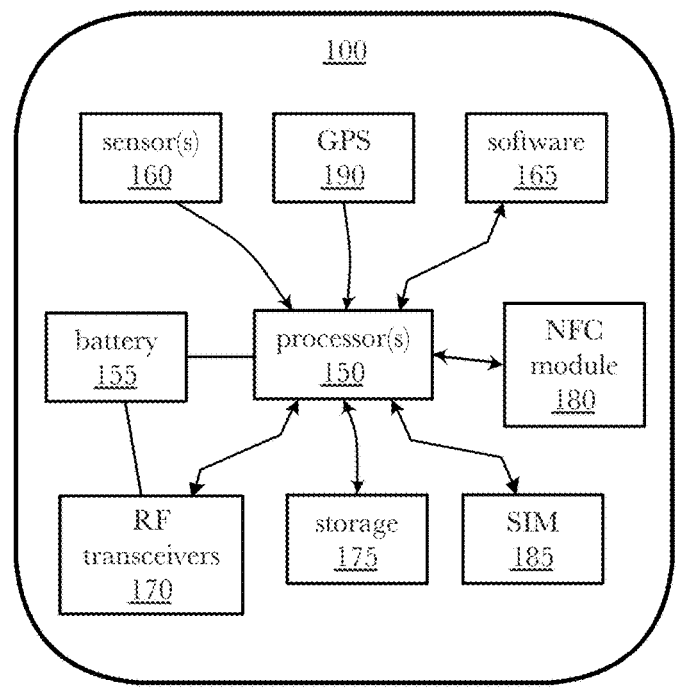
FIG. 3 illustrates a block diagram of portable communication device components according to an embodiment of the invention.

FIG. 3 illustrates a portable communication device 100 components according to an embodiment of the invention. From an internal component point of view, the communication device 100 may include one or more processors 150 for executing instructions, processing data, and controlling the functions of the communication device 100. A sensor input component 160 may receive and send signals and/or data between the processor(s) 150 and the various user input/output components such as the microphone 105, speaker 110, LED 120, and buttons 115, 130, 135. Some sensors that may be integrated into the communication device 100 may include an accelerometer and a gyroscope among others. A generalized software component 165 includes computer code for controlling and executing the various functions and components of the communications device 100. The software component 165 may also represent downloaded or pre-loaded software applications. The software component 165 may be stored in storage component 175 which may be one or both of random access memory (RAM) or Read-only memory (ROM). The storage component 175 may also encompass mechanisms like subscriber identity module (SIM) cards 185. The communication device 100 is powered by a power source such as, for instance, a battery 155 coupled with the components needing power like the processor(s) 150 and RF transceivers 170, and NFC module 180. The RF transceivers 170 may be embedded into chip sets for cellular communication (2G, 3G, 4G, LTE, 5G, etc.), 802.11 WiFi communication, and Bluetooth communication. The NFC module 180 provides a data exchange capability between two communication devices 100 for various purposes.

Figure 4:
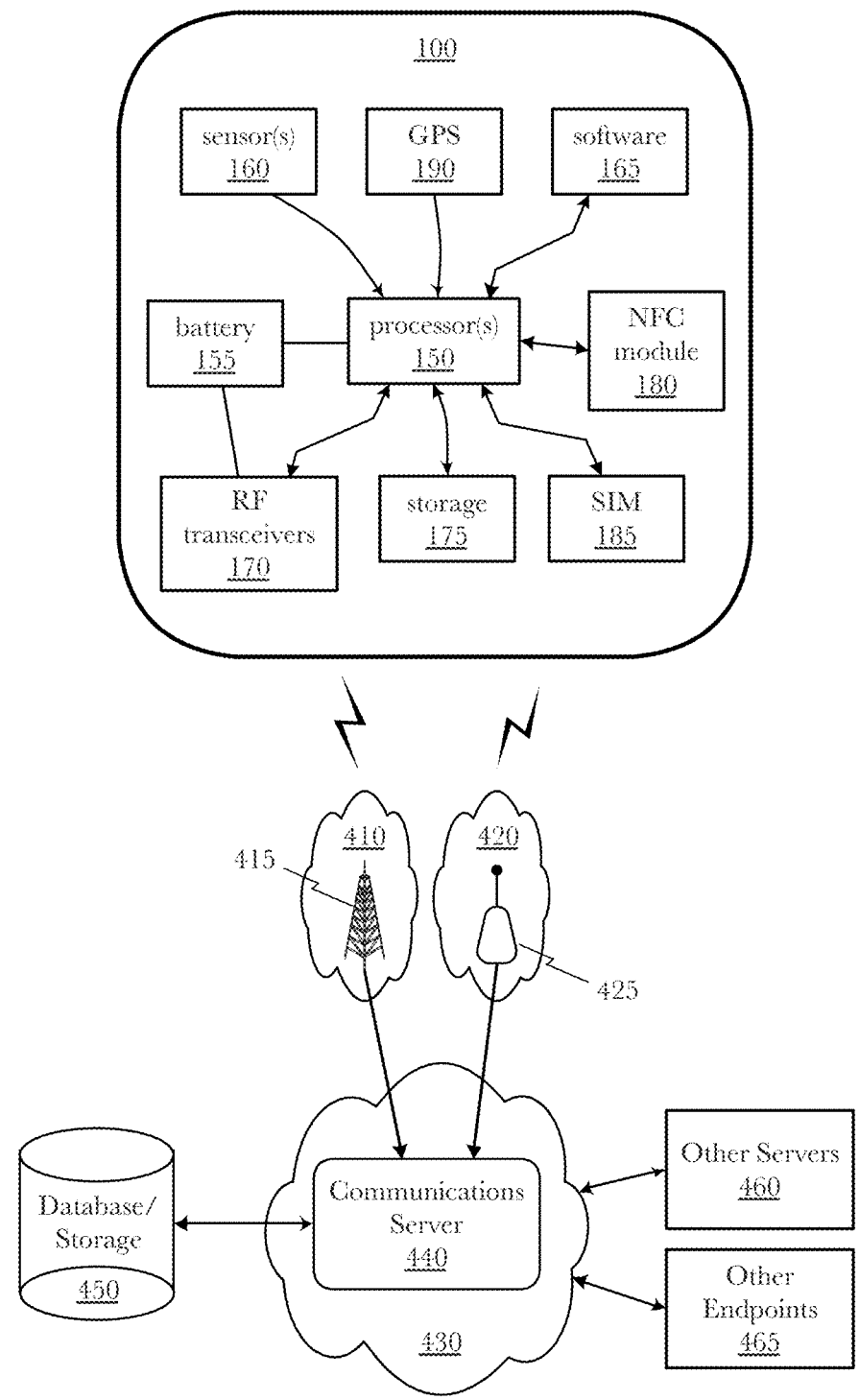
FIG. 4 illustrates an example block diagram for a networked environment.

FIG. 4 illustrates an exemplary networked environment 400 for implementing certain embodiments described herein. The networked environment 400 may include multiple distinct inter-connected networks such as, for instance, a large scale internet protocol (IP) network (e.g., the Internet) 430, one or more IP based local area networks or wide area networks (LANs/WANs) 420 including 802.11 wireless access point(s) 425, and one or more mobile radio access networks (MRANs) 410 accessible via a cellular basestation tower(s) 415. A communications server 440 may be reachable or connected to the IP network 430. The communications server 440, in turn, may be communicable with one or more other servers 460 or other endpoints 465. In addition, the communications server 440 may store data in an associated memory and/or database 450. For instance, the communications server 440 may receive data from a communication device 100 and store it in the associated memory/database 450 for future reference or use. In addition, the communications server 440 may receive data from a communication device 100 and forward it to another server 460 for action or to another endpoint 465 for consumption.

It should be noted that alternative wireless IP based networks (not shown) that do not operate over the frequency spectrum typically associated with 802.11 (e.g., WiFi) or cellular may be implemented. One example of such an alternate wireless IP network may be WiMAX (e.g., 802.16). Other examples may include, but are not limited to, networks utilizing television whitespace frequencies and other unlicensed (or yet to be licensed) frequencies, including, but not limited to, those under consideration for 5G implementations. These may include wireless networks operating within a frequency range of 100 MHz and 700 MHz, 900 MHz industrial, scientific, and medical (ISM) bands, and wireless networks operating within a frequency range of 3.5 GHz and 3.7 GHz, and anything at or above 5 GHz including light-wave based transmission systems.

The MRANs 410 and the LANs 420 each have backhaul IP connectivity to the Internet 430 that provide connectivity with the communications server 440. In certain embodiments, MRANs 410 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards—e.g., 5G.

In addition to circuit switched radio transmission schemes, each MRAN 410 may also provide communication devices 100 with wireless IP based data access to the Internet 430 using one of the aforementioned cellular IP protocols. For illustration only, one communication device 100 has been illustrated. The architecture of FIG. 4 and the broader description herein may support multiple communication devices 100. Similarly, an IP access point 425 may provide wireless connectivity for communication device 100 to the Internet 430 using any of the 802.11 WiFi standards and/or any other type of IP based connectivity standard.

In operation, communication device(s) 100 may establish a connection with and register with the communications server 440. The connection may comprise one or more communication links utilizing LAN 420 or MRAN 410. Once established, the communication device(s) 100 may exchange data, including voice communications, with the communication server 440.

FIG. 5 illustrates an example of a logic flow 500 diagram according to an embodiment of the invention. The logic flow 500 may be representative of some or all of the operations executed by one or more embodiments described herein. Further, the logic flow 500 may performed by circuitry and one or more components discussed herein. Moreover, logic flows may be performed in conjunction with one or more other logic flows discussed herein and lists particular steps occurring in a particular order. However, embodiments are not limited in this manner and any step may occur in any order. Further, steps of the logic flows may not be dependent upon one another and as such particular steps in the logic flows may not occur.

Logic flow 500 may facilitate the configuration and operation of a panic mode on a communication device 100. The process may broadly encompass configuring the communication device 100 to react in a particular manner when panic mode is engaged. Once configured, the communication device 100 may engage panic mode by following whatever steps set out in the configuration process which may include any number of things including, but not limited to, a single quick button press, a single long button press (e.g., 2 or more seconds), multiple short button presses (e.g., 3 quick presses), a specific sequence of button presses (e.g., short-long-short), a keyword recognition, a keyword recognition plus a button press, etc. The exact triggering mechanism may be configured and altered by the end user to their own liking without altering the spirit or scope of the disclosed embodiments herein.

Engaging panic mode may cause one or more of the following to occur: a loud shrill noise, an open microphone to record the environment, the collecting of metadata like time, date, location, and perhaps even one or more notifications to other endpoints. One of the features of the embodiments is the ability to simultaneously emit a loud shrill noise and record the environment without capturing the loud shrill noise. This may be achieved by low/mid pass filtering the recording while emitting the loud shrill noise at a higher frequency outside the recording filter. Another option may be to perform echo cancellation techniques.

Prior to engaging or using a panic mode, it is configured on the communication device 100. For instance, the user may be guided through a process of responding to questions about how that user wants panic mode to react when engaged. The first step may be to put the communication device 100 into a state associated with panic mode, or more specifically, panic mode configuration. This may be achieved on a screenless communication device 100 by manipulating one or more buttons until the communication device 100 audibly responds with a message to the effect "panic mode setup" or the like. On a communication device 100 with a screen the user may select a visual icon for panic mode and select input triggers that will visually guide the configuration process. In an alternative embodiment, a screenless communication device 100 may be remotely configured using a smartphone, tablet, or computer to take advantage of the display capabilities of the remote device.

One aspect of configuration that must be set is how panic mode will be triggered on the communication device 100. The user may customize their own trigger mechanism based on the buttons and speech recognition (if available). The user may select a series of button pushes of varying length. For example, a single long button push may activate panic mode. Or, a quick succession of button pushes like three in a row. Or, a combination of short-long-short. The duration of a short or long button push may be arbitrarily defined by the device maker so long as there is a discernable difference between what is considered long and short. It should not matter if the threshold for a long press is 1 second, 1.5 seconds, 2 seconds or more, just that once the threshold is met, the communication device 100 transitions the button press from short to long.

In another embodiment, the communication device 100 may include speech recognition capability such that panic mode engagement may be configured to recognize a keyword or phrase spoken. The keyword or phrase may be configured by the user and the communication device 100 may be trained to recognize it.

Once the trigger mechanism is set, there may be multiple additional features to engage or suppress when panic mode is triggered. For instance, will the communication device 100 emit a loud shrill noise, will the communication device 100 automatically record its environment, will the communication device 100 start collecting vital metadata, and will the communication device automatically launch alerts to other endpoints. Once the configuration profile is set (it can be changed at any time by the user), the communication device 100 will react according to the configuration profile when engaged.

In step 505, the user may engage the panic mode on the communication device 100 by initiating the triggering mechanism. As described above, an example of a triggering mechanism may be three rapid short duration button presses. Other triggering mechanisms may be implemented without altering the spirit or scope of the disclosed embodiments.

Engaging the panic mode may initiate at least four (4) distinct actions. In decision block 507, the communication device 100 may determine whether to send a notification that panic mode has been engaged to another endpoint based on the current configuration profile. In decision block 510, the communication device 100 may determine whether silent mode should be engaged or disengaged based on the current configuration profile. In decision block 515, the communication device 100 may determine whether alert mode should be engaged or disengaged based on the current configuration profile. In block 520, the communication device 100 may begin collecting metadata such as periodic date/time stamps and location data in the form of GPS coordinates that may be translated into a street address or the like. The metadata may be periodically sent to the communications server 440 until panic mode on the communication device 100 has been terminated. The periodicity of sending the metadata may be configured into the system. For instance, the collected metadata may be forwarded every 3, 5, 10, or 30 seconds or any other interval deemed appropriate without altering the spirit or scope of the embodiments described herein. Other metadata that may be able to be acquired may include nearby MAC addresses of other devices, nearby WiFi access points, and Bluetooth device identifiers. The purpose of the metadata is to provide as much context to any recorded audio picked up by the microphone 105, and/or context to the incident triggering the panic mode in general.

Consider a scenario in which panic mode has been engaged by a young woman in an outdoor parking lot after being accosted by an unknown assailant. The communication device 100 may start recording voices, sounds, and other noises in the immediate environment while simultaneously emitting a high pitched warning alarm like sound at the loudest volume the communication device 100 is capable of emitting to hopefully drive the assailant away. The victim may start speaking a description of the assailant and any other identifying information that may be used later to track or identify the assailant. The metadata may be attached to the recorded audio to provide an exact time/date and location of the attack. More sophisticated metadata may also be collected when possible. For instance, the communication device 100 could store the identities of all devices it "senses" via Bluetooth, WiFi, or otherwise including MAC addresses, IP addresses, Bluetooth identifiers, etc. A MAC address is given to a network adapter when it is manufactured. It is hardwired or hard-coded onto your computer's or phone's or tablet's network interface card (NIC) and is unique to it.

This type of information could prove extremely valuable in placing other devices at the scene of the incident at the exact same time. Suppose the assailant has their own communication device that was visible and identifiable to the victim's communication device 100. Their MAC address, Bluetooth ID, or other device identifier may be discernable by the communication device 100. If that metadata were saved and contemporaneously time/date and location tagged with the audio recording, it could provide compelling evidence that the assailant was indeed the perpetrator. This type of metadata may also help identify potential witnesses the same way.

Referring back to decision block 507, if it is determined that a notification of panic mode engagement is to be sent, communication device 100 may request communications server 440 or the communications server 440 may recognize that panic mode has been engaged and act accordingly to alert one or more other endpoints that panic mode was initiated by communication device 100 in block 517. The notification may be sent to multiple endpoints and may include varying amounts of data. For instance, at a minimum, the communications server 440 may send a simple alert to the specific endpoints identified during the panic mode configuration process. If the receiving endpoint is another screenless device, the alert may be comprised of a canned audio message to the effect, "_____ communication device has just engaged panic mode". The spoken words may be accompanied by an emergency alert type tone to heighten the urgency of the situation. The audio message may be repeated until affirmatively acknowledged by the receiving device. For endpoints that do possess a screen, the same type of audible alert may be sent but may be supplemented or replaced with a visual pop-up displaying the alert message. In addition to a generic alert, the current location of the communication device 100 that triggered panic mode may be included in the alert. Moreover and as will be described below, if silent mode has been set and the microphone 105 of communication device 100 is streaming audio data to communications server 440, communications server 440 may also send the audio stream to the other endpoints as well as storing it.

Referring back to the silent mode determination in decision block 510, it should be noted that in young healthy individuals the full range of human hearing extends from 20 Hz to 20 kHz. Most people lose the ability to hear higher frequencies as they age. Many adults lose the ability to hear tones above 12 kHz after the age of 30. In contrast, human speech typically covers a range of approximately 200 Hz-3.5 kHz. Even allowing for some excited speech to reach pitches of 8 kHz, it is fair to create a cut-off between what is spoken or even shrieked by a human at approximately 8 kHz. Thus, setting a microphone to filter and record input no higher than 8 kHz while causing a speaker to emit a tone above 8 kHz but below 12 kHz will allow for the playing of such a tone without interfering with what is being recorded. The upper limit of 12 kHz may be selected to ensure it is heard by most humans.

If silent mode is determined to be set, the communication device 100 may activate microphone 105 in block 525 in conjunction with software 165, and processors 150 to begin recording the environment immediate to the communication device 100. As described above, the microphone 105 for this feature may be filtered to record tones or sounds only as high as 8 kHz. Once the microphone 105 is active, audio may be automatically streamed in block 540 from communication device 100 to communications server 440 where it may be stored in storage/database 450. The detected audio may also be stored locally on communication device 100. The streamed or locally stored audio may be periodically tagged with the collected metadata in block 560 so as to authenticate the recorded audio with a time/date and location. Any other collected metadata may be stored and associated with the recorded audio as well, both locally on the communication device 100 and by communications server 440. Decision block 550 determines whether to continue streaming audio to communications server 440 or if panic mode has been terminated.

Referring back to decision block 515, if alert mode is determined to be engaged, the communication device 100 may generate a loud shrill sound in block 530. The generated loud shrill sound may then be output through speaker 110 in block 545. The loud shrill sound may also be emitted at the loudest levels the communication device 100 is capable of emitting. As described above, the alert may be a noise that falls somewhere between 8-12 kHz so as to be high pitched enough to be heard by anyone nearby but above the microphone recording cutoff threshold. This will ensure the alert does not interfere with audio recording. Decision block 555 determines whether to continue playing the alert or if panic mode has been terminated.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The invention claimed is:

1. A method of managing a panic mode for a communication device in a communication system that includes a communications server, the method comprising:

engaging a panic mode on a communication device via a triggering event, the communication device including a cellular transceiver;
simultaneously causing the communication device to: (i) emit an audible alert at a frequency above 8 kHz; and (ii) detect and capture any audio at frequencies below 8 kHz such that the captured audio does not include any noise attributable to the emitted audible alert;
causing the communication device to collect a first type of metadata while panic mode is engaged on the communication device, the first type of metadata including a date stamp, a time stamp, and a location;
causing the communication device to collect a second type of metadata while panic mode is engaged, the second type of metadata comprising any detected other device identifiers unique to nearby devices, the other device identifiers including one or more of a MAC address, a Bluetooth device identifier, and a near field communication (NFC) device identifier; and
causing the cellular transceiver to send a notification message to at least one other associated communication device and at least one additional endpoint via the communications server, the notification message indicative of the communication device having engaged panic mode.

2. The method of claim 1, comprising storing the captured audio locally on the communication device.

3. The method of claim 2, comprising associating and storing the collected first and second type of metadata with the captured audio.

4. The method of claim 1, comprising streaming the captured audio to a communications server.

5. The method of claim 4, comprising streaming the collected first and second type of metadata to the communications server and associating and storing the first and second type of metadata with the captured audio.

6. The method of claim 1, wherein the triggering event comprises recognizing one or more button pushes on the communication device.

7. The method of claim 1, wherein the triggering event comprises recognizing a keyword or phrase.

8. A communication device configured to manage a panic mode in a communication system that includes a communications server, comprising:
an input mechanism;
a speaker component;
a microphone component;
a location determination component;
one or more radio frequency (RF) transceivers, at least one of the one or more radio frequency (RF) transceivers being a cellular transceiver; and
one or more processors configured to execute instructions to manage a panic mode, the instructions to:
engage a panic mode on a communication device via a triggering event;
simultaneously cause the communication device to: (i) emit an audible alert at a frequency above 8 kHz; and (ii) detect and capture any audio at frequencies below 8 kHz such that the captured audio does not include any noise attributable to the emitted audible alert;
cause the communication device to collect a first type of metadata while panic mode is engaged on the communication device, the first type of metadata including a date stamp, a time stamp, and a location;
cause the communication device to collect a second type of metadata while panic mode is engaged, the second type of metadata comprising any detected other device identifiers unique to nearby devices, the other device identifiers including one or more of a MAC address, a Bluetooth device identifier, and a near field communication (NFC) device identifier; and
cause the cellular transceiver to send a notification message to at least one other associated communication device and at least one additional endpoint via the communications server, the notification message indicative of the communication device having engaged panic mode.

9. The communication device of claim 8, the one or more processors configured to execute instructions to manage a panic mode comprising instructions to store the captured audio locally on the communication device.

10. The communication device of claim 9, the one or more processors configured to execute instructions to manage a panic mode comprising instructions to associate and store the collected first and second type of metadata with the captured audio.

11. The communication device of claim 8, the one or more processors configured to execute instructions to manage a panic mode comprising instructions to stream the captured audio to a communications server.

12. The communication device of claim 11, the one or more processors configured to execute instructions to manage a panic mode comprising instructions to stream the collected first and second type of metadata to the communications server, and associate and store the first and second type of metadata with the captured audio.

13. The communication device of claim 8, the triggering event comprising recognizing one or more button pushes on the communication device.

14. The communication device of claim 8, the triggering event comprising recognizing a keyword or phrase.

15. A non-transitory computer-readable storage medium comprising a plurality of instructions that when executed enable processing circuitry to execute instructions within a communication device to manage a panic mode in a communication system that includes a communications server, the instructions to:
engage a panic mode on a communication device via a triggering event, the communication device including a cellular transceiver;
simultaneously cause the communication device to: (i) emit an audible alert at a frequency above 8 kHz; and (ii) detect and capture any audio at frequencies below 8 kHz such that the captured audio does not include any noise attributable to the emitted audible alert;
cause the communication device to collect a first type of metadata while panic mode is engaged on the communication device, the first type of metadata including a date stamp, a time stamp, and a location;
cause the communication device to collect a second type of metadata while panic mode is engaged, the second type of metadata comprising any detected other device identifiers unique to nearby devices, the other device identifiers including one or more of a MAC address, a Bluetooth device identifier, and a near field communication (NFC) device identifier; and
cause the cellular transceiver to send a notification message to at least one other associated communication device and at least one additional endpoint via the communications server, the notification message indicative of the communication device having engaged panic mode.

16. The non-transitory computer-readable storage medium of claim 15, the plurality of instructions configured to store the captured audio locally on the communication device.

17. The non-transitory computer-readable storage medium of claim 16, the plurality of instructions configured to associate and store the collected first and second type of metadata with the captured audio.

18. The non-transitory computer-readable storage medium of claim 15, the plurality of instructions configured to stream the captured audio to a communications server.

19. The non-transitory computer-readable storage medium of claim 18, the plurality of instructions configured to stream the collected first and second type of metadata to the communications server, and associate and store the first and second type of metadata with the captured audio.

20. The non-transitory computer-readable storage medium of claim 15, the triggering event comprising recognizing one or more button pushes on the communication device.

21. The non-transitory computer-readable storage medium of claim 15, the triggering event comprising recognizing a keyword or phrase.

\* \* \* \* \*